US010922141B2

(12) United States Patent
Srinivasan et al.

(10) Patent No.: US 10,922,141 B2
(45) Date of Patent: Feb. 16, 2021

(54) PRESCRIPTIVE ANALYTICS BASED COMMITTED COMPUTE RESERVATION STACK FOR CLOUD COMPUTING RESOURCE SCHEDULING

(71) Applicant: Accenture Global Solutions Limited, Dublin (IE)

(72) Inventors: Madhan Kumar Srinivasan, Karnataka (IN); Arun Purushothaman, Karnataka (IN); Manish Sharma Kolachalam, Karnataka (IN); Michael S. Eisenstein, Seattle, WA (US)

(73) Assignee: Accenture Global Solutions Limited, Dublin (IE)

( * ) Notice: Subject to any disclaimer, the term of this patent is extended or adjusted under 35 U.S.C. 154(b) by 193 days.

(21) Appl. No.: 15/922,659

(22) Filed: Mar. 15, 2018

(65) Prior Publication Data

US 2019/0179675 A1    Jun. 13, 2019

(30) Foreign Application Priority Data

Dec. 11, 2017  (IN) .............................. 201741044406

(51) Int. Cl.
    *G06F 9/50*    (2006.01)
    *G06F 9/455*   (2018.01)
    *G06F 9/451*   (2018.01)

(52) U.S. Cl.
    CPC ............ *G06F 9/5077* (2013.01); *G06F 9/451* (2018.02); *G06F 9/45533* (2013.01); *G06F 2209/5014* (2013.01)

(58) Field of Classification Search
    None
    See application file for complete search history.

(56) References Cited

U.S. PATENT DOCUMENTS

| 5,907,675 A | 5/1999 | Aahlad |
| 8,336,049 B2 | 12/2012 | Medovich |
(Continued)

FOREIGN PATENT DOCUMENTS

| CN | 103023993 A | * | 4/2013 |
| CN | 105279012 A | * | 1/2016 |
(Continued)

OTHER PUBLICATIONS

N. C. Luong, P. Wang, D. Niyato, Y. Wen and Z. Han, "Resource Management in Cloud Networking Using Economic Analysis and Pricing Models: A Survey," in IEEE Communications Surveys & Tutorials, vol. 19, No. 2, pp. 954-1001, Secondquarter 2017, doi: 10.1109/COMST.2017.2647981. (Year: 2017).*

(Continued)

*Primary Examiner* — Abu Zar Ghaffari
(74) *Attorney, Agent, or Firm* — Brinks Gilson & Lione (57) ABSTRACT

A multi-layer committed compute reservation stack may generate prescriptive reservation matrices for controlling static reservation for computing resources. A transformation layer of the committed compute reservation stack may generate a time-mapping based on historical utilization and tagging data. An iterative analysis layer may determine a consumption-constrained committed compute state of a distribution of static reservation and dynamic requisition that achieves one or more consumption efficiency goals. Once the consumption-constrained committed compute state is determined, the prescriptive engine layer may generate a reservation matrix that may be used to control computing resource static reservation prescriptively.

20 Claims, 4 Drawing Sheets

(56) References Cited

U.S. PATENT DOCUMENTS

| | | | |
|---|---|---|---|
| 8,423,998 B2* | 4/2013 | Isci | G06F 9/5077 |
| | | | 718/1 |
| 8,612,599 B2 | 12/2013 | Tung et al. | |
| 8,862,914 B2 | 10/2014 | Kansal et al. | |
| 9,253,101 B2* | 2/2016 | Bejerano | H04L 41/5006 |
| 9,367,340 B2 | 6/2016 | Wang | |
| 9,495,215 B2* | 11/2016 | Podvratnik | G06F 9/5027 |
| 9,804,897 B2* | 10/2017 | Song | G06F 9/45558 |
| 10,241,840 B2* | 3/2019 | Tsai | G06F 9/505 |
| 2008/0276245 A1* | 11/2008 | Wu | G06F 9/5016 |
| | | | 718/104 |
| 2010/0269109 A1 | 10/2010 | Cartales | |
| 2011/0055385 A1 | 3/2011 | Tung et al. | |
| 2011/0247001 A1* | 10/2011 | Smith | G06F 9/52 |
| | | | 718/104 |
| 2011/0302578 A1 | 12/2011 | Isci et al. | |
| 2012/0096165 A1 | 4/2012 | Madduri et al. | |
| 2012/0166644 A1* | 6/2012 | Liu | G06F 9/5094 |
| | | | 709/226 |
| 2013/0042003 A1* | 2/2013 | Franco | G06F 9/45558 |
| | | | 709/226 |
| 2013/0042123 A1 | 2/2013 | Smith et al. | |
| 2014/0019964 A1* | 1/2014 | Neuse | G06F 9/45533 |
| | | | 718/1 |
| 2014/0136269 A1 | 5/2014 | Wasser | |
| 2014/0298349 A1* | 10/2014 | Jackson | G06Q 50/06 |
| | | | 718/104 |
| 2014/0344810 A1* | 11/2014 | Wang | G06F 9/455 |
| | | | 718/1 |
| 2015/0278061 A1 | 10/2015 | Siciliano et al. | |
| 2015/0286507 A1* | 10/2015 | Elmroth | G06F 9/5061 |
| | | | 718/104 |
| 2015/0334696 A1* | 11/2015 | Gu | H04L 67/1095 |
| | | | 718/1 |
| 2016/0232022 A1 | 8/2016 | Kania et al. | |
| 2016/0357610 A1 | 12/2016 | Bartfai-Walcott et al. | |
| 2017/0042461 A1* | 2/2017 | Hodas | G09B 7/00 |
| 2018/0060106 A1* | 3/2018 | Madtha | H04L 41/12 |
| 2019/0079848 A1 | 3/2019 | Srinivasan et al. | |
| 2019/0205150 A1 | 7/2019 | Srinivasan et al. | |
| 2019/0266534 A1* | 8/2019 | Kessaci | G06F 9/45558 |

FOREIGN PATENT DOCUMENTS

| | | | |
|---|---|---|---|
| EP | 2391961 A1 | 12/2011 | |
| EP | 2904491 A1 | 8/2015 | |
| WO | WO 2010/121017 A2 | 10/2010 | |
| WO | WO-2014055028 A1 * | 4/2014 | G06F 9/5061 |

OTHER PUBLICATIONS

A. Dalvandi, M. Gurusamy and K. C. Chua, "Application Scheduling, Placement, and Routing for Power Efficiency in Cloud Data Centers," in IEEE Transactions on Parallel and Distributed Systems, vol. 28, No. 4, pp. 947-960, Apr. 1, 2017, doi: 10.1109/TPDS.2016. 2607743. (Year: 2017).*

U.S. Appl. No. 16/154,174, filed Oct. 8, 2018.

U.S. Appl. No. 16/219,435, filed Dec. 13, 2018.

U.S. Appl. No. 16/285,539, filed Feb. 26, 2019.

U.S. Appl. No. 16/411,064, filed May 13, 2019.

U.S. Appl. No. 16/423,720, filed May 28, 2019.

Amazon CloudWatch—Cloud & Network Monitoring Services, aws.amazon.com/cloudwatch/?nc1=h_ls, dated Jun. 29, 2017, 5p.

Cloudyn for Enterprise, https://www.cloudyn.com/enterprise/, dated Jun. 30, 2017, 3p.

How Do I Stop and Start EC2 Instances at Regular Intervals Using AWS Lambda, aws.amazon.com/es/premiumsupport/knowledge-center/start-stop-lambda-cloudwatch/, dated Jun. 29, 2017, 5p.

Husain Bohra, Ata E., et al., "VMeter: Power Modelling for Virtualized Clouds," Department of Computer Science and Engineering, University at Buffalo, State University of New York, NY), aehusain,vipin@buffalo.edu, (2010), pp. 1-8.

Trusted Advisor Best Practices (Checks), aws.amazon.com/es/premiumsupport/trustedadvisor/best-practices/, dated Jun. 29, 2017, 6p.

Xiao, Zhen, et al., "Dynamic Resource Allocation using Virtual Machines for Cloud Computing Environment," IEEE Transactions on Parallel and Distributed Systems, vol. 24:No. 6, (2013), pp. 1107-1117.

Australian Patent Office, Examination Report No. 1 for Australian Application No. 2017261531 dated May 7, 2018, pp. 1-8.

Extended European Search Report dated Jun. 4, 2018, pp. 1-8. Issued in European Application No. 17202112.3, European Patent Office, The Hague, The Netherlands.

Extended Search Report issued on European patent application No. 18204198.8 dated Apr. 26, 2019, 11 pages.

Examination Report No. 2 for Australian patent application No. 2018250388, dated Oct. 29, 2019, 6 pages.

First Examination Report issued on Indian application No. 201741044406 dated Aug. 5, 2020, 8 pages.

* cited by examiner

PRESCRIPTIVE ANALYTICS BASED COMMITTED COMPUTE RESERVATION STACK FOR CLOUD COMPUTING RESOURCE SCHEDULING

PRIORITY CLAIM

This application claims priority to, and incorporates by reference in its entirety, Indian Patent Application No. 201741044406, filed Dec. 11, 2017, entitled Prescriptive Analytics Based Committed Compute Reservation Stack for Cloud Computing Resource Scheduling.

TECHNICAL FIELD

This disclosure relates to cloud computing resource scheduling via a prescriptive analytics based committed compute reservation stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

In various cloud computing systems, computing resources such as virtual machines, memory, processor cores, or other computing resources may be scheduled for planned utilization. Such cloud computing resources may be on-demand or dynamic in nature. In some cases, a computing resource may be requested by a cloud computing system as committed compute (e.g., a reserved instance, a committed purchase, or other static reservation over an extended period). Such a committed reservation may offer more efficient consumption and utilization profiles compared to on-demand compute usage. In some cases, the computing resource acquired through the static reservation may remain unutilized for all or a significant portion of the duration of the static reservation due to an unpredicted lack of demand. Further, insufficient reservations of computing resources may lead to increased reliance on dynamic resource utilization. Deliberate provisioning of static usage may ensure an accurate level of utilization of computing resources rather than an inaccurate reliance on requests for on-demand resources or other dynamic requisitions. Balancing the usage of static and dynamic requisitions resources for such disparate workloads may lead to comparatively efficient consumption profiles thereby maximizing the overall computing capacity that can be obtained for a given resource pool. As a result, appropriate computing resources may be statically reserved leading to efficient utilization of resources while other workloads are better suited to dynamic requisitioning. In other cases, uncertainty may lead to insufficient static reservation of resources, which in turn, may lead to over utilization of scheduled resources, performance degradation, and/or service interruption (e.g., degradation in the performance of the underlying hardware).

Accordingly, increased static reservation accuracy provides a technical solution to the technical problem of system inefficiency by increasing the utilization and efficiency of cloud computing resources for given resource inputs. The committed compute reservation stack techniques and architectures described below may be used to accurately prescribe future static reservation recommendations based on consumption-constrained committed compute (CC) state analysis. Further, the analysis may include data sources such as, utilization data, expenditure report data for resource reservation/activation, computing resource consumption metric data, activation request data, functional grouping data, topological or relationship data, tagging data, or other metadata. Thus, a committed compute reservation (CCR) stack may provide prescriptive analytical static reservation scheduling taking into account resource utilization patterns, computing resource types, computing resource availability, consumption metric data, workload and topological data, geographic data, and/or other data. Thus, the disclosed CCR stack techniques and architectures improve the operation of the underlying hardware by increasing computing efficiency and provide an improvement over existing solutions.

The CCR stack may analyze historical utilization data, tagging data and consumption metric data to predict future utilization and produce prescriptive recommendations. Utilization data, may include, for example, historical data related to usage or activation of cloud computing resources, e.g., resource allocation history, activation/reservation/committed-use history data, expenditure report data for resource reservation/activation/committed-use, processor activity, memory usage history, computing cycles, data throughput, or other utilization metrics, seasonal usage cycles e.g., holiday schedules, daily usage cycles, weekly usage cycles, quarterly usage cycles or other data. Tagging data may include computing resource specific data. For example, tagging data may include data provided by an operator, provisioning or configuration management system, or an analyzed system detailing functional groupings (e.g., project-specific allocations, hardware (including virtualized hardware) marked for a specific purpose, availability zones, operating systems applications, installed software, or other groupings), quality of service requirements, minimum allocations, or other tagging data. Consumption metric data may include computing resource specific cost metrics such as expenditure-per-time or resource-per-time metrics.

Figure 1:
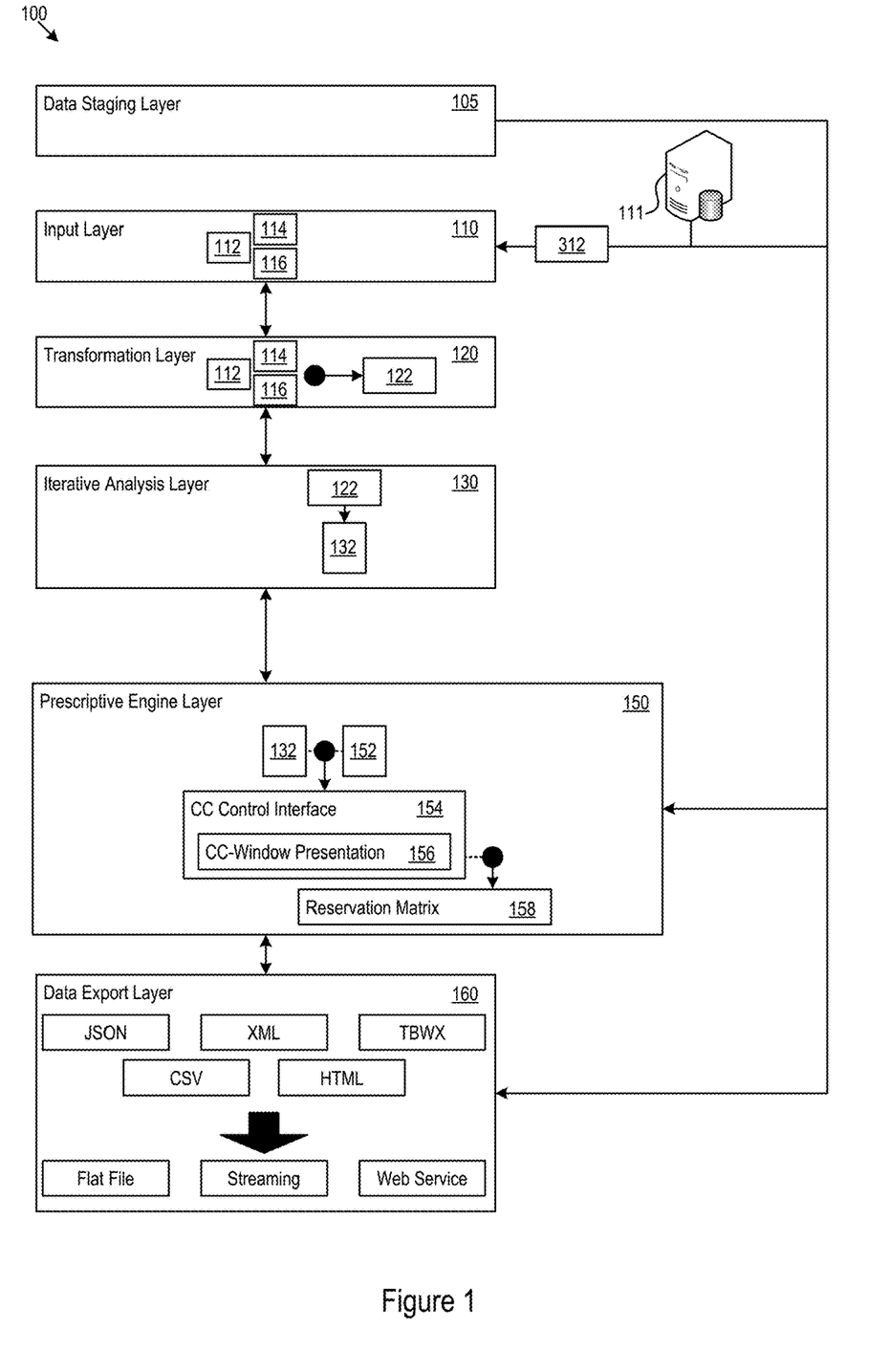
FIG. 1 shows an example multiple-layer committed compute reservation stack.

FIG. 1 shows an example multiple layer CCR stack 100. In this example, the CCR stack 100 includes a data staging layer 105, an input layer 110, a transformation layer 120, an iterative analysis layer 130, a prescriptive engine layer 150, and a data export layer 160. The CCR stack 100 may include a multiple-layer computing structure of hardware and/or software that may provide prescriptive analytical recommendations (e.g., static reservation scheduling for virtual machines or other computing resource activation scheduling) through data analysis.

In some implementations, as discussed below, C3RA—a Cloud Compute Committed Reservation Advisor developed by Accenture® Bangalore may be operated as the CCR stack 100.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the CCR stack 100, the data staging layer 105 may provide the input layer 110 with storage resources to store ingested historical utilization data within a database. Hence, the memory access layer 105 may provide a hardware resource, e.g., memory storage resources, to the input layer 110. Accordingly, the multiple-layer stack architecture of the CCR stack may improve the functioning of the underlying hardware.

Figure 2:
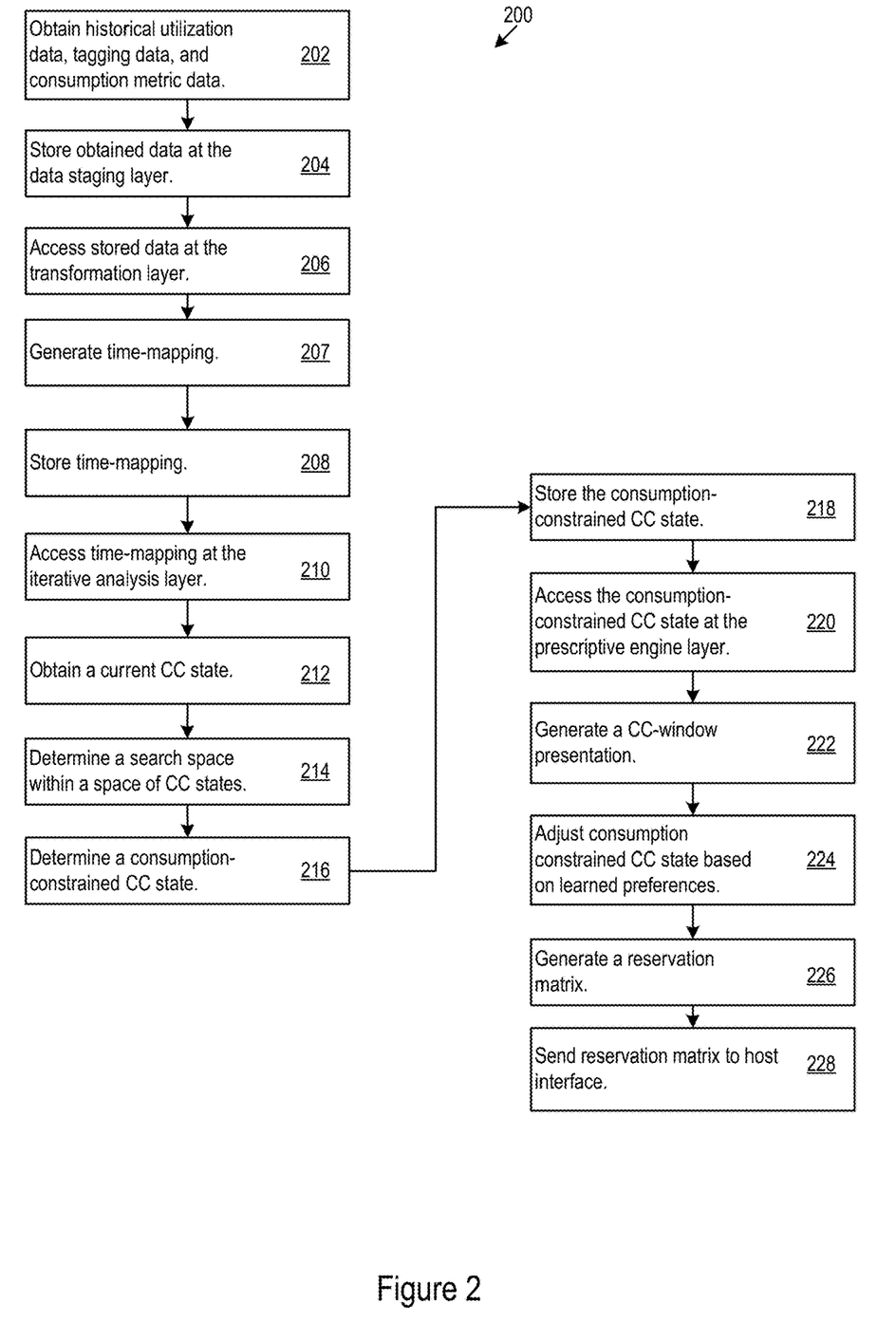
FIG. 2 shows example committed compute reservation stack logic.

In the following, reference is made to FIG. 1 and the corresponding example CCR stack logic (CSL) 200 in FIG. 2. The logical features of CSL 200 may be implemented in various orders and combinations. For example, in a first implementation, one or more features may be omitted or reordered with respect to a second implementation. At the input layer 110 of the CCR stack 100, the CSL 200 may obtain historical utilization data 112, consumption metric data 114, and tagging data 116 (202) and then store the obtained data at the data staging layer 105 (204). In some cases, the historical utilization data 112, consumption metric data 114, and tagging data 116 may be received via communication interfaces (e.g., communication interfaces 312, discussed below). The historical utilization data 112, consumption metric data 114, and tagging data 116 may be accessed at least in part, e.g., via the communication interfaces 312, from data sources 111, which may include, cloud compute utilization databases, cloud expenditure databases, master virtual machine cost databases, committed-use history databases, virtual machine family/template description data, infrastructure/project tags or other data sources. The historical utilization data 112 may be provided by cloud compute utilization databases, cloud expenditure databases, committed-use history databases, or other utilization data sources. The consumption metric data 114 may be provided by cloud expenditure databases, master virtual machine cost databases, virtual machine family/template/platform as a service, description data, or other consumption metric data sources. The tagging data 116 may be provided by virtual machine family/template description data, infrastructure/project tags or other tagging data sources.

After the historical utilization data 112, consumption metric data 114, and tagging data 116 are obtained and stored, the transformation layer 120 may access the stored data (206) using memory resources passed from the data staging layer 105 (e.g., memory access resources). The transformation layer 120 may process the stored data 112, 114, 116 to generate a time-mapping 122 of active periods for computing resources (207). The time-mapping 122 may include a time-correlated history and cycle analysis of past computing resource usage.

In some cases, the techniques and architectures used in conjunction with the activation timetable stack described in U.S. patent application Ser. No. 15/811,339, which is entirely included herein by reference, may be used to perform or assist in generation of the time-mapping. Therein, the input layer of the activation timetable stack may parse historical utilization data, consumption metric data, and tagging data to identify patterns at multiple timescales. The input layer of the activation timetable stack may then generate time-correlated consumption data. In an illustrative scenario of how the CCR stack may utilize the activation timetable stack outputs, the parsing of the historical utilization data, consumption metric data, and tagging data, done by the input layer of the activation timetable stack may be implemented by the transformation layer 120 of the CCR stack to generate the time-mapping 122.

Additionally or alternatively, to process the stored data 112, 114, 116, the transformation layer 120 may analyze time components of the stored data 112, 114, 116 to determine time related patterns. For example, the transformation layer may identify weekly, monthly, holiday, seasonal, or other time cycles present within the stored data 112, 114, 116. Time-independent data, such as, non-conditional functional group assignments, may be applied to all time periods. However, temporal or otherwise dynamic functional groupings may be correlated to corresponding timescales.

To generate the time-mapping, the transformation layer 120 may determine one or more timescales (e.g., timescales including time-invariant contributions) present within the data. For example, the transformation layer 120 may apply various frequency analyses to the data to determine periodic, aperiodic, and/or time-invariant trends. Additionally or alternatively, the transformation layer 120 may apply rule-based analyses such as holiday schedules, operational hours, or annual enterprise cycles that may be expressly defined by rules rather than through inferential analysis.

Once the time-mapping 122 is generated, the transformation layer 120 may store the time-mapping 122, via a database operation at the data staging layer 105 (208). For example, the time-scaled pattern data 122 may be stored on storage dedicated to the CSL 200. Additionally or alternatively, the time-scaled pattern data 122 may be stored on a shared database or cloud storage. Accordingly, the data staging layer 105 may further access network resources (e.g., via communication interfaces 312, discussed below) to implement memory resource provision to the other layers. In an example implementation, the CSL 200 may be defined within a Revolution-R environment. However, other design platforms may be used.

The iterative analysis layer 130 may access the time-mapping 122 using a memory resource provided by the data staging layer 105 (210). For example, the data staging layer 105 may provide a memory read resource (such as a SQL database read resource) to the iterative analysis layer 130 to allow access to the time-scaled pattern data 122.

After accessing the time-mapping 122, the iterative analysis layer 130 may obtain a current CC state for the computing resources (212). A current CC state may include a distribution of static reservations and dynamic requisitions for a set of computing resources. In some cases, the current CC state may be an initial CC state as an input to the iterative analysis layer routine. For example, an initial CC state may include a pre-analysis distribution. This may include a default distribution, corresponding to the number of virtual machines active, number of CC instances and number of on-demand hours.

In some implementations, the iterative analysis layer 130 may use an activation timetable, such as those produced by the activation timetable stack described in U.S. patent application Ser. No. 15/811,339, previously included by reference herein, to provide an initial activation state for computing resources. To obtain a current CC state, the iterative analysis layer 130 may apply default distributions as discussed above.

Additionally or alternatively, the iterative analysis layer may estimate activations based on the time-mapping 122 cycles determined by the transformation layer 120, assuming an entirety of a given set of computing resources is activated for all time activation periods, or using random activation states for the computing resources. Once activation states are assumed a current CC state may be obtained by applying a default distribution.

In some cases, the current CC state may be the CC state obtained from performing an analysis on a previous CC state. Accordingly, the iterative analysis layer may iteratively approach a consumption-constrained CC state as the output of layer.

Once a current CC state is obtained, the iterative analysis layer 130 may utilize non-linear search techniques (e.g., non-linear optimization or other non-linear search techniques) to search the space of CC states (in some cases iteratively search using multiple successive determinations of the preceding CC states) to determine a consumption-constrained CC state (216).

A consumption-constrained CC state may include a CC state describing a distribution of static reservation and dynamic requisition that meets one or more criteria for output. For example, a consumption-constrained CC state may include a consumption extrema (e.g., a resource consumption minimum or maximum, e.g., as determined by the analysis performed by the iterative analysis layer 130) for an expected set of computing resources based on the time-mapping 122 and the current CC state as inputs. For example, such extrema may be determined through an optimization analysis. In some cases, the consumption-constrained CC state 132 may include a CC state that achieves a defined goal, e.g., a resource savings/consumption goal over an existing resource cost, a target performance level below a threshold resource cost, or other goal.

In some cases, successive current CC states may be used by the iterative analysis layer 130. This iterative analysis may converge on a consumption-constrained CC state corresponding to the time-mapping 122.

In some cases, convergence speed and accuracy may be improved by selecting a more accurate initial CC state. For example, initial CC state derived from activation timetables, such as those produced by the activation timetable stack described in U.S. patent application Ser. No. 15/811,339, previously included by reference herein, may produce comparatively accurate time mapping 122 and improve convergence and overall accuracy relative to initial state determined with no case-specific information (e.g., all off/all on).

The non-linear search may include a region of validity surrounding the current CC state in a space of CC states. This search space may be bounded by boundary conditions. For example, certain distributions of static reservation and dynamic reservation may be impractical and therefore disallowed. In some cases, the search space may also exclude consumption-constrained CC state solutions with non-physical meanings such as negative or imaginary numbers of static or dynamic reservations.

Further, the search space may also include a confidence region in which convergence on a solution is feasible or achievable within a constrained analysis timeframe. Additionally or alternatively, the search space may be determined dynamically by the iterative analysis layer 130 via convergence checks within the routine, e.g., the analysis performed by the iterative analysis layer 130. Alternatively or additionally, the iterative analysis layer may run an analysis through convergence multiple times and adjust the search space after each successive run of the routine.

In an illustrative example, the iterative analysis layer 130 may implement the example routine in Table 1 to determine a distribution of static reservations and dynamic requisitions for a set of virtual machines.

TABLE 1

Example Routine for Determination of Consumption-Constrained CC state Description

| | |
|---|---|
| Example Routine | UTILIZATION AND COST DATA:<br>  FOR EACH UNIQUE VM TYPE:<br>    FOR EACH SUCCESSIVE TIME PERIOD:<br>      CALCULATE NO. OF VMS 'ON':<br>      DATA$ON<br>  OPTIMIZE:<br>    OBJECTIVE FUNCTION {<br>    OD_PERIODS <- SUM (max (0,<br>    DATA$ON - NO_CC))<br>    RETURN (CON_CC*CC_PERIODS*NO_CC +<br>    CON_OD*OD_PERIODS)<br>    }<br>END |

OD_PERIODS: Total on-demand (OD) time periods
NO_CC: Number of committed compute (CC) instances
CON_OD: Consumption profile of on-demand compute per unit time
CON_CC: Consumption profile of committed compute per unit time
CC_PERIODS: Time period for which committed compute instances would have to be requisitioned The analysis of the current CC state may take place within the optimization of the objective function within the example routine. The calculation of the number of virtual machines that are "on" may be satisfied with initial data, which may be based on the time-mapping, a default state, an activation timetable (as discussed above), or other initial state data source.

In some implementations, such as those using the example routine in Table 1, the iterative analysis layer 130 may employ an optimization analysis to determine the consumption-constrained CC state 132 based on the input data to the iterative analysis layer 130. In some cases, the optimization analysis may include a nonlinear optimization algorithm. For example, a constrained optimization by linear approximation (COBYLA) routine may be used by the iterative analysis layer 130.

Once the consumption-constrained CC state 132 is determined, the iterative analysis layer 130, may store the consumption-constrained CC state 132 via the data staging layer 105 (218). This may facilitate access of the consumption-constrained CC state 132 by the prescriptive engine layer 150 (220).

The prescriptive engine layer 150 may further access feedback history data 152. The feedback history data 152 may be based on commands previously received from a CC control interface 154.

The prescriptive engine layer 150 may analyze the consumption-constrained CC state 132 to generate a CC-window presentation 156 for display on the CC control interface 154 (222). The CC-window presentation 156 (as discussed below) may include data and/or selectable options related to the distribution of static reservations and dynamic requisitions for computation resources defined within the consumption-constrained CC state 132. The CC-window presentation 156 may be configured to display (e.g., to an operator) the prescriptive recommendations of the CCR stack with regard to upcoming static reservations. Accordingly, an option to forward a reservation matrix, to a host interface for scheduling computing resources, in accord the static reservations may be included as one of the selectable options available through the CC-window presentation 156.

Additionally or alternatively, the CC-window presentation 156 may also include options for the operator to manually adjust the distribution. For example, the CC-window presentation 156 may include an option to adjust a threshold resource consumption profile level at which a static reservation is prescribed. For example, a particular operator may prefer to avoid using a static reservation (e.g., as opposed to filling demand with dynamic requisition) unless a threshold marginal (or average) consumption savings can be achieved (or maintained) for an additional static reservation. In some cases, a particular operator may prefer to use static reservations even when no consumption saving or an expected underutilization may occur. Accordingly, the prescriptive engine layer 150 may refine consumption saving goals based on learned preferences from an operator. For example, static reservations may be associated with reduced variance in cyclic resource consumption, e.g., monthly, yearly, or other consumption period. Accordingly, the particular operator may prefer a given level of static reservation to maintain a particular variance level. Thus, the operator may prefer static reservation be used unless an expected consumption savings can be achieved through reliance on dynamic requisition.

In some cases, based on past adjustments or commands, e.g., the feedback history, the prescriptive engine layer 150 may adjust the consumption-constrained CC state 132 to better conform to learned operator preferences, e.g., by predicting adjustments likely to be implemented by the operator (224).

In some cases, the CC-window presentation 156 may include expected resource consumption reductions based on uses of the distribution defined by the consumption-constrained CC state 132 compared with other distributions. For example, the CC-window presentation may show selectable options with subsets of the total group of computing resources included in the analysis. Accordingly, the CC-window presentation 156 may show that a specific portion of the total available consumption savings for the entire group of computing resources may be achieved through adjustment of only a portion of the computing resources. For example, the CC-window may show that a disproportionate amount of savings may be achieved through a specific subset. Accordingly, the operator may choose, e.g., via selectable options on the CC-window presentation 156, to adjust that subset of computing resources forgoing the smaller marginal returns available from adjusting the other computing resources.

Based on the consumption-constrained CC state 132, adjustments made based on feedback history data 152, and any command received via the CC control interface 154, the prescriptive engine layer 150 may generate a reservation matrix 158 (226). The reservation matrix may designate static reservations over the prescribed period.

In various implementations the length of the prescribed period may be designated by the system. The accuracy prediction of demand over the prescribed period may be dependent on the length of historical utilization data used. For example, in some system a 2:1 or 3:2 ratio (e.g., minimum ratio) of the period historical utilization data to the prescribed period may be used. In an illustrative example, a minimum of three months of historical utilization data may be used to predict over a period of two months.

After generation of the reservation matrix 158, the CSL 200 may initiate deployment of the reservation matrix by causing network interface circuitry (e.g., the communication interfaces 312) to send the reservation matrix 158 to a host interface for control of the computing resources (228). For example, services such as Amazon® Web Services (AWS), Google® Compute Engine, Microsoft® Azure, or other cloud computing services, may maintain host interfaces (e.g., web interfaces, application programming interfaces, or other interfaces) by which clients may define operation of the computing resources. The CSL 200 may also use a scheduling proxy system that uses the reservation matrix data to maintain schedules, calling the service provider's application programming interfaces for each reservation control action defined by the reservation matrix.

In some cases, the CSL 200 may initiate deployment via the data export layer 160. The data export layer 160 may format the reservation matrix in one or more formats for transfer. For example the data export layer 160 may support format translation to java script object notation (JSON), eXtensible markup language (XML), comma separated value (CSV), Tableau Workbook (TBWX), hyper-text markup language (HTML) or other formats. The data export layer 160 may also support transfer of the reservation matrix in one or more states, such as flat file transfers, streaming transfers, web service access, internet protocol transfers, or other transfers.

Additionally or alternatively, the CSL 200 may initiate deployment via the prescriptive engine layer 150 through direct transfer, direct network access, or other non-export transfer.

Figure 3:
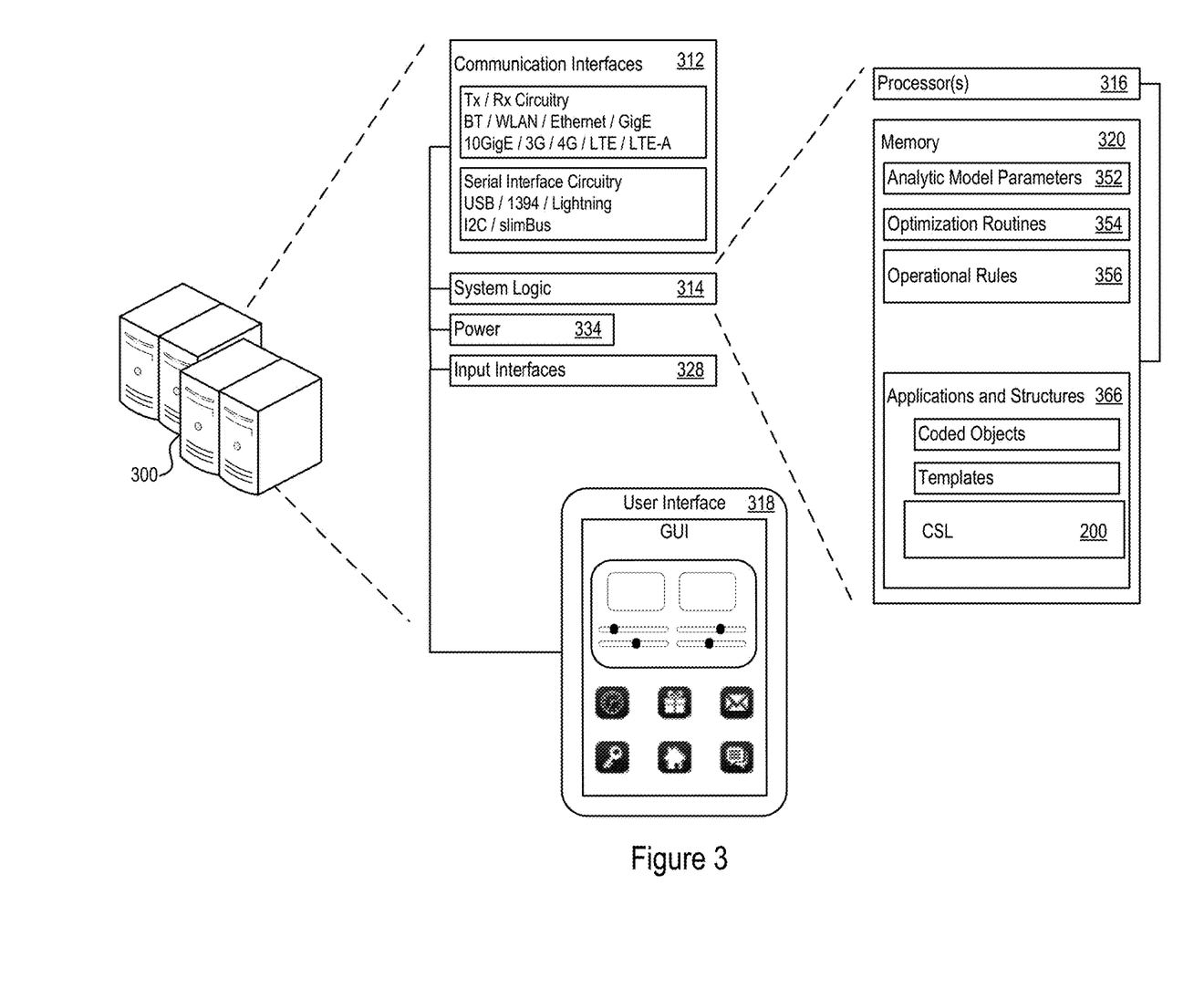
FIG. 3 shows an example specific execution environment for the committed compute reservation stack of FIG. 1.

FIG. 3 shows an example specific execution environment 300 for the CCR stack 100 described above. The execution environment 300 may include system logic 314 to support execution of the multiple layers of CCR stack 100 described above. The system logic may include processors 316, memory 320, and/or other circuitry.

The memory 320 may include analytic model parameters 352, optimization routines 354, and operational rules 356. The memory 320 may further include applications and structures 366, for example, coded objects, machine instructions, templates, or other structures to support time-mapping generation, consumption-constrained state determination, or other tasks described above. The applications and structures may implement the CSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, I²C, slimBus, or other serial interfaces. The communication interfaces 312 may be used to support and/or implement remote operation of the CC control interface 154. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the CC control interface 154. In various implementations, the system logic 314 may be distributed over one or more physical servers, be implemented as one or more virtual machines, be implemented in container environments such as Cloud Foundry or Docker, and/or be implemented in Serverless (functions as-a-Service) environments.

In some cases the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the CCR stack 100, of the execution environment onto the hardware resources. In some cases, a manifest may be stored as a preference file such as a YAML (yet another mark-up language), JSON, or other preference file type.

Figure 4:
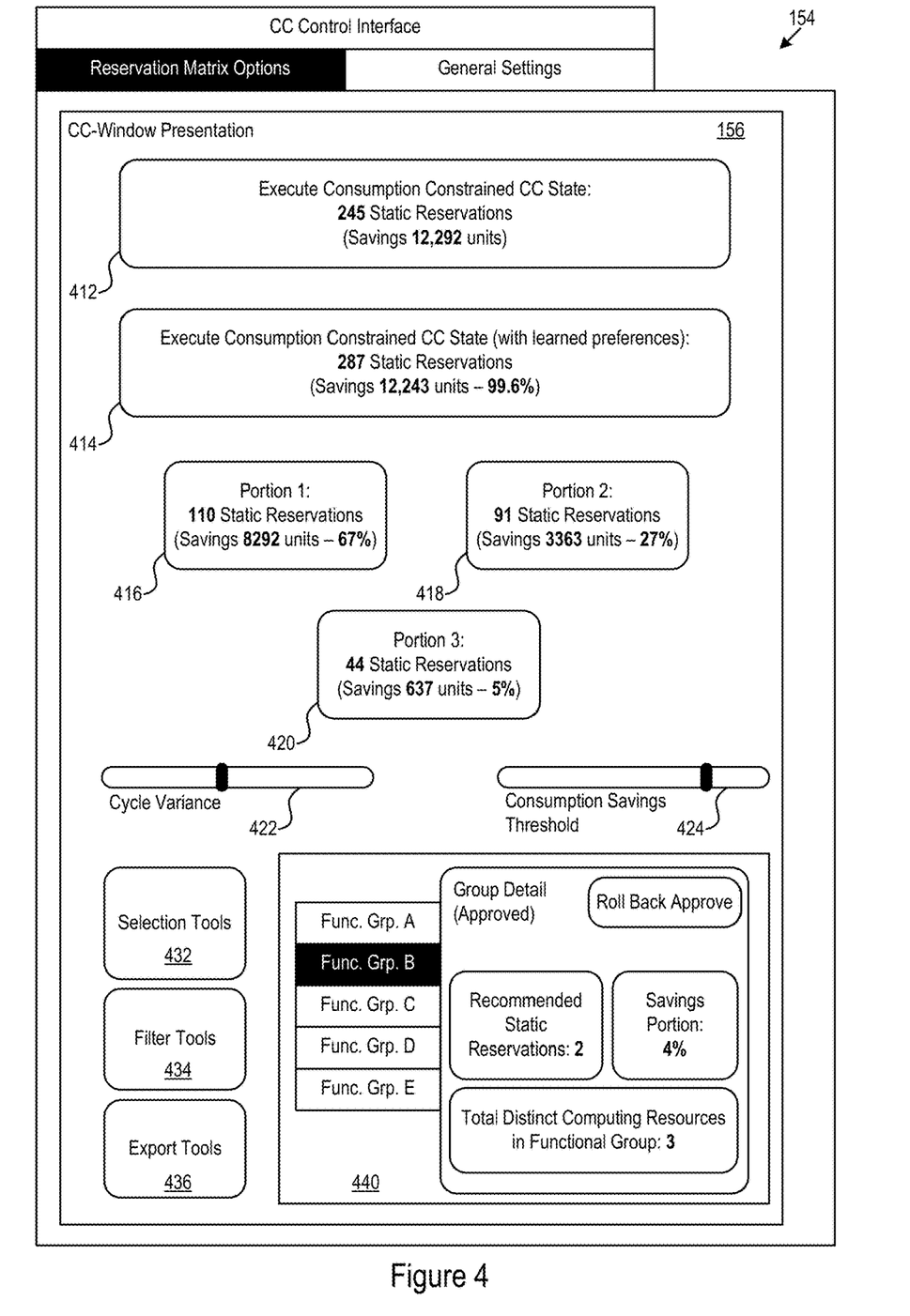
FIG. 4 shows an example committed compute control interface.

Referring now to FIG. 4, an example CC control interface 154 is shown. The CC control interface 154 includes an example CC-window presentation 156 as discussed above. The CC-window presentation 156 may include multiple selectable options 412, 414, 416, 418, 420, 422, 424 and data regarding the consumption-constrained CC state 132 after adjustment to accommodate the learned preferences of the operator. In this example scenario, the selectable options may include an option 412 to implement the un-adjusted consumption-constrained CC state 132, an option 414 to implement the consumption-constrained CC state with the adjustments based on learned preferences, options 416, 418, 420 to implement augments to selected subsets of the computing resources, options 422, 424 to adjust preferences (e.g., variance levels, consumption thresholds, or other preferences) and re-run the routine at the iterative analysis layer 130, or other selectable options to control the eventual reservation matrix output.

Additionally or alternatively, the CC-window presentation 156 may include selection and filter tools 432, 434 to support granular manipulation of static reservation, e.g., by computing resource, by function group, or other granular manipulation. The CC-window presentation 156 may also include export tools 436 for management of data export layer 160 operations.

In some implementations, the CC-window presentation 156 may include a functional group detail panel 440 for management of group-level selectable options such as group level approvals of static reservation. Additionally or alternatively, the functional group detain panel 440 may display group-level information regarding static reservation.

In the example, shown in FIG. 4, the options 416, 418, 420 allow for manipulation of selected subsets of the computing resources. The options 416, 418, 420 show the respective portions of the total consumption savings that may be achieved by adjusting each specific subset of the computing resources. In the example, the first subset option 416 provides the greatest marginal consumption savings, while the options 418, 420 provide successively smaller marginal consumption savings.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system comprises: network interface circuitry configured to: receive historical utilization data for a set of virtual machines; receive consumption metric data for the set of virtual machines; receive tagging data defining a functional grouping for a first virtual machine of the set of virtual machines; send a reservation matrix to a host interface configured to control static reservation and dynamic requisition for at least the first virtual machine; reservation circuitry in data communication with the network interface circuitry, the reservation circuitry configured to execute a committed compute reservation (CCR) stack, the CCR stack comprising: a data staging layer; an input layer; a transformation layer; an iterative analysis layer; and a prescriptive engine layer; the CCR stack configured to: obtain, via a data control tool at the input layer, the historical utilization data, the consumption metric data, and the tagging data; store, at the data staging layer, the historical utilization data, the consumption metric data, and the tagging data; access, at the transformation layer, the historical utilization data and the consumption metric data via a memory resource provided by the data staging layer; process, at the transformation layer, the historical utilization data and the tagging to generate a time-mapping of active periods for virtual machines within the functional grouping; store, via operation at the data staging layer, the time-mapping; obtain, at the iterative analysis layer, a current CC state for the set of virtual machines; access, at the iterative analysis layer, the consumption metric data; within an analysis space of CC states, use non-linear search to determine a search space around the current CC state; based on the time-mapping and the consumption metric data, determine a consumption-constrained CC state comprising a static reservation prescription for at least the first virtual machine; store, via operation at the data staging layer, the consumption-constrained CC state; access the consumption-constrained CC state at the prescriptive engine layer; analyze the consumption-constrained CC state responsive to a feedback history based on commands from a CC control interface; responsive to analyzing the consumption-constrained CC state, generate, at the prescriptive engine layer, a CC-window presentation for the CC control interface; and after generation of the CC-window presentation, generate the reservation matrix based on at least the consumption-constrained CC state and the feedback history.

A2 The system of example A1, where the CCR stack is configured to obtain the current CC state based on an initial CC state describing a pre-analysis distribution of static reservation and dynamic requisition.

A3 The system of example A2, where the transformation layer is configured to obtain the initial CC state from an activation timetable generated using an activation timetable stack.

A4 The system of any of examples A1-A3, where the CCR stack is configured to, at the iterative analysis layer, iteratively obtain the consumption-constrained CC state by obtaining the current CC state by non-linear search around a previous CC state.

A5 The system of any of examples A1-A4, where the CC-window presentation comprises consumption metric data for the consumption-constrained CC state.

A6 The system of any of examples A1-A5, where the CC-window presentation is configured to present the consumption metric data for the consumption-constrained CC state alongside consumption metric data for multiple selectable CC state options.

A7 The system of any of examples A1-A6, where the CCR stack is configured to determine consumption-constrained CC state by applying a nonlinear optimization algorithm.

A8 The system of any of examples A1-A7, where the nonlinear optimization algorithm comprises a constrained optimization by linear approximation (COBYLA) routine.

A9 The system of any of examples A1-A8, where the historical utilization data comprises resource allocation history, activation history data, reservation history data, committed-use history data, expenditure report data, processor activity, memory usage history, computing cycles consumption, data throughput, temporal usage cycle data, or any combination thereof.

A10 The system of any of examples A1-A9, where tagging data comprises virtual machine provisioning data, virtual machine functional group definitions, project-specific allocation data, availability zone data, operating system data, quality of service data, or any combination thereof.

A11 The system of any of examples A1-A10, where the CCR stack is configured to generate the reservation matrix based further on an input selection received from the CC control interface responsive to the CC-window presentation.

A12. The system of any of examples A1-A11, where the CCR stack is configured to and responsive to the feedback history and at prescriptive the prescriptive engine layer, refine a consumption savings threshold for generation of the reservation matrix.

B1 In an example a method includes: at network interface circuitry: receiving historical utilization data for a set of virtual machines; receiving consumption metric data for the set of virtual machines; and receiving tagging data defining a functional grouping for a first virtual machine of the set of virtual machines; at reservation circuitry in data communication with the network interface circuitry, the reservation circuitry configured to execute a committed computer reservation (CCR) stack: obtaining, via a data control tool at an input layer of the CCR stack, the historical utilization data, the consumption metric data, and the tagging data; storing, at a data staging layer of the CCR stack, the historical utilization data, the consumption metric data, and the tagging data; accessing, at a transformation layer of the CCR stack, the historical utilization data and the consumption metric data via a memory resource provided by the data staging layer; processing, at the transformation layer, the historical utilization data and the tagging to generate a time-mapping of active periods for virtual machines within the functional grouping; storing, via operation at the data staging layer, the time-mapping; at an iterative analysis layer of the CCR stack: obtaining a current CC state for the set of virtual machines; accessing the consumption metric data; within an analysis space of CC states, use non-linear search to determine a search space around the current CC state; and based on the time-mapping and the consumption metric data, determining a consumption-constrained CC state comprising a static reservation prescription for at least the first virtual machine; storing, via operation at the data staging layer, the consumption-constrained CC state; at a prescriptive engine layer of the CCR stack: accessing the consumption-constrained CC state; analyzing the consumption-constrained CC state responsive to a feedback history based on commands from a CC control interface; responsive to analyzing the consumption-constrained CC state, generating a CC-window presentation for the CC control interface; and after generation of the CC-window presentation, generating a reservation matrix based on at least the consumption-constrained CC state and the feedback history; and sending, via the network interface circuitry, the reservation matrix to a host interface configured to control static reservation and dynamic requisition for at least the first virtual machine.

B2 The method of example B1, where obtaining the current CC state comprises obtaining the current CC state based on an initial CC state describing a pre-analysis distribution of static reservation and dynamic requisition.

B3 The method of example B2, where obtaining the initial CC state comprises obtaining the initial CC state from an activation timetable generated using an activation timetable stack.

B4 The method of any of examples B1-B3, where determining the consumption-constrained CC state comprises obtaining the current CC state by non-linear search around a previous CC state.

B5 The method of any of examples B1-B4, where the CC-window presentation comprises consumption metric data for the consumption-constrained CC state.

B6 The method of any of examples B1-B5, where the CC-window presentation presents the consumption metric data for the consumption-constrained CC state alongside consumption metric data for multiple selectable simulated CC state options.

C1 In an example, a product includes: machine-readable media other than a transitory signal; instructions stored on the machine-readable media, the instructions, when executed, configured to cause a machine to: at network interface circuitry: receive historical utilization data for a set of virtual machines; receive consumption metric data for the set of virtual machines; and receive tagging data defining a functional grouping for a first virtual machine of the set of virtual machines; at reservation circuitry in data communication with the network interface circuitry, the reservation circuitry configured to execute a committed compute reservation (CCR) stack: obtain, via a data control tool at an input layer of the CCR stack, the historical utilization data, the consumption metric data, and the tagging data; store, at a data staging layer of the CCR stack, the historical utilization data, the consumption metric data, and the tagging data; access, at a transformation layer of the CCR stack, the historical utilization data and the consumption metric data via a memory resource provided by the data staging layer; process, at the transformation layer, the historical utilization data and the tagging to generate a time-mapping of active periods for virtual machines within the functional grouping; store, via operation at the data staging layer, the time-mapping; at an iterative analysis layer of the CCR stack: obtain a current CC state for the set of virtual machines; access the consumption metric data; within an analysis space of CC states, using non-linear search determine a search space around the current CC state; and based on the time-mapping and the consumption metric data, determine a consumption-constrained CC state comprising a static reservation prescription for at least the first virtual machine; store, via operation at the data staging layer, the consumption-constrained CC state; at a prescriptive engine layer of the CCR stack: access the consumption-constrained CC state; analyze the consumption-constrained CC state responsive to a feedback history based on commands from a CC control interface; responsive to analyzing the consumption-constrained CC state, generate a CC-window presentation for the CC control interface; and after generation of the CC-window presentation, generate a reservation matrix based on at least the consumption-constrained CC state and the feedback history; and send, via the network interface circuitry, the reservation matrix to a host interface configured to control static reservation and dynamic requisition for at least the first virtual machine.

C2 The product of example C1, where the instructions are further configured to cause the machine to generate the reservation matrix based further on an input selection received from the CC control interface responsive to the CC-window presentation.

D1 A method implemented by operation of a system of any of examples A1-A12.

E1 A product comprising instructions stored on a machine readable medium, the instructions configured to cause a machine to implement the method of example D1.

Various implementations have been specifically described. However, many other implementations are also possible.

What is claimed is:

1. A system comprising:
   network interface circuitry configured to:
      receive historical resource utilization data for a set of virtual machines;
      receive consumption metric data for the set of virtual machines;
      receive tagging data defining a functional grouping for a first virtual machine of the set of virtual machines;
      send a reservation matrix to a host interface configured to control static reservation and dynamic requisition for at least the first virtual machine, the reservation matrix including one or more requests for one or more committed compute virtual machines of the set of virtual machines;
   reservation circuitry in data communication with the network interface circuitry, the reservation circuitry configured to execute a committed compute reservation (CCR) stack,
   the CCR stack comprising:
      a data staging layer;
      an input layer;
      a transformation layer;
      an iterative analysis layer; and
      a prescriptive engine layer;
   the CCR stack configured to:
      obtain, via a data control tool at the input layer, the historical utilization data, the consumption metric data, and the tagging data;
      store, at the data staging layer, the historical utilization data, the consumption metric data, and the tagging data;
      access, at the transformation layer, the historical utilization data and the tagging data via a memory resource provided by the data staging layer;
      process, at the transformation layer, the historical utilization data and the tagging data to generate a time-mapping of active periods for virtual machines within the functional grouping;
      store, via operation at the data staging layer, the time-mapping;
      obtain, at the iterative analysis layer, a current committed compute (CC) state for the set of virtual machines, the current CC state detailing one or more pre-analysis committed compute states for one or more virtual machines of the set of virtual machines;
      access, at the iterative analysis layer, the consumption metric data;
      within an analysis space of CC states, use boundary conditions to determine a search space for a non-linear search, the search space around the current CC state, where a disallowed CC state is outside the search space but within the analysis space;
      based on the time-mapping, the consumption metric data, and the previous CC state, determine, responsive to a non-linear search iteration of the non-linear search, a consumption-constrained CC state comprising a static reservation prescription for at least the first virtual machine;
      store, via operation at the data staging layer, the consumption-constrained CC state;
      access the consumption-constrained CC state at the prescriptive engine layer;
      analyze the consumption-constrained CC state responsive to a feedback history, the feedback history based on commands from a committed compute (CC) control interface;
      responsive to analyzing the consumption-constrained CC state, generate, at the prescriptive engine layer, a committed compute window (CC-window) presentation for the CC control interface; and
      after generation of the CC-window presentation, generate the reservation matrix based on at least the consumption-constrained CC state and the feedback history.

2. The system of claim 1, where the CCR stack is configured to obtain the current CC state based on an initial CC state describing a pre-analysis distribution of static reservation and dynamic requisition.

3. The system of claim 1, where the CCR stack is configured to, at the iterative analysis layer, iteratively obtain the consumption-constrained CC state by obtaining the current CC state by using the non-linear search around a previous CC state.

4. The system of claim 1, where the CC-window presentation comprises consumption metric data for the consumption-constrained CC state.

5. The system of claim 4, where the CC-window presentation is configured to present the consumption metric data for the consumption-constrained CC state alongside consumption metric data for multiple selectable CC state options.

6. The system of claim 1, where the CCR stack is configured to determine consumption-constrained CC state by applying a nonlinear optimization algorithm.

7. The system of claim 6, where the nonlinear optimization algorithm comprises a constrained optimization by linear approximation (COBYLA) routine.

8. The system of claim 1, where the historical utilization data comprises resource allocation history, activation history data, reservation history data, committed-use history data, expenditure report data, processor activity, memory usage history, computing cycles consumption, data throughput, temporal usage cycle data, or any combination thereof.

9. The system of claim 1, where tagging data comprises virtual machine provisioning data, virtual machine functional group definitions, project-specific allocation data, availability zone data, operating system data, quality of service data, or any combination thereof.

10. The system of claim 1, where the CCR stack is configured to generate the reservation matrix based further on an input selection received from the CC control interface responsive to the CC-window presentation.

11. The system of claim 1, where the CCR stack is configured to and responsive to the feedback history and at the prescriptive engine layer, refine a consumption savings threshold for generation of the reservation matrix.

12. A method including:
  at network interface circuitry:
    receiving historical resource utilization data for a set of virtual machines;
    receiving consumption metric data for the set of virtual machines; and
    receiving tagging data defining a functional grouping for a first virtual machine of the set of virtual machines;
  at reservation circuitry in data communication with the network interface circuitry, the reservation circuitry configured to execute a committed compute reservation (CCR) stack:
    obtaining, via a data control tool at an input layer of the CCR stack, the historical utilization data, the consumption metric data, and the tagging data;
    storing, at a data staging layer of the CCR stack, the historical utilization data, the consumption metric data, and the tagging data;
    accessing, at a transformation layer of the CCR stack, the historical utilization data and the tagging data via a memory resource provided by the data staging layer;
    processing, at the transformation layer, the historical utilization data and the tagging data to generate a time-mapping of active periods for virtual machines within the functional grouping;
    storing, via operation at the data staging layer, the time-mapping;
    at an iterative analysis layer of the CCR stack:
      obtaining a current committed compute (CC) state for the set of virtual machines, the current CC state detailing one or more pre-analysis committed compute states for one or more virtual machines of the set of virtual machines;
      accessing the consumption metric data;
      within an analysis space of CC states, based on boundary conditions, determining a search space for a non-linear search, the search space around the current CC state, where a disallowed CC state is outside the search space but within the analysis space; and
      based on the time-mapping and the consumption metric data, determining, responsive to a non-linear search iteration of the non-linear search, a consumption-constrained CC state comprising a static reservation prescription for at least the first virtual machine;
    storing, via operation at the data staging layer, the consumption-constrained CC state;
    at a prescriptive engine layer of the CCR stack:
      accessing the consumption-constrained CC state;
      analyzing the consumption-constrained CC state responsive to a feedback history based on commands from a committed compute (CC) control interface;
      responsive to analyzing the consumption-constrained CC state, generating a committed compute window (CC-window) presentation for the CC control interface; and
      after generation of the CC-window presentation, generating a reservation matrix based on at least the consumption-constrained CC state and the feedback history; and
  sending, via the network interface circuitry, the reservation matrix to a host interface configured to control static reservation and dynamic requisition for at least the first virtual machine, the reservation matrix including one or more requests for one or more committed compute virtual machines of the set of virtual machines.

13. The method of claim 12, where obtaining the current CC state comprises obtaining the current CC state based on an initial CC state describing a pre-analysis distribution of static reservation and dynamic requisition.

14. The method of claim 13, where obtaining the initial CC state comprises obtaining the initial CC state from an activation timetable generated using an activation timetable stack.

15. The method of claim 12, where defining the search space includes obtaining the current CC state by determining a confidence region around a previous CC state, the confidence region including a region in which search algorithm convergence is achievable within a defined analysis timeframe.

16. The method of claim 12, where the CC-window presentation comprises consumption metric data for the consumption-constrained CC state.

17. The method of claim 16, where the CC-window presentation presents the consumption metric data for the consumption-constrained CC state alongside consumption metric data for multiple selectable simulated CC state options.

18. A product including:
  machine-readable media other than a transitory signal;
  instructions stored on the machine-readable media, the instructions, when executed, configured to cause a machine to:

at network interface circuitry:
  receive historical utilization data for a set of virtual machines, the historical utilization data detailing historical utilization of the set of virtual machines;
  receive consumption metric data for the set of virtual machines; and
  receive tagging data defining a functional grouping for a first virtual machine of the set of virtual machines;
at reservation circuitry in data communication with the network interface circuitry, the reservation circuitry configured to execute a committed compute reservation (CCR) stack:
  obtain, via a data control tool at an input layer of the CCR stack, the historical utilization data, the consumption metric data, and the tagging data;
  store, at a data staging layer of the CCR stack, the historical utilization data, the consumption metric data, and the tagging data;
  access, at a transformation layer of the CCR stack, the historical utilization data and the tagging data via a memory resource provided by the data staging layer;
  process, at the transformation layer, the historical utilization data and the tagging data to generate a time-mapping of active periods for virtual machines within the functional grouping;
  store, via operation at the data staging layer, the time-mapping;
  at an iterative analysis layer of the CCR stack:
    obtain a current committed compute (CC) state for the set of virtual machines one or more pre-analysis committed compute states;
    access the consumption metric data;
    within an analysis space of CC states, based on boundary conditions determine a search space for a non-linear search, the search space around the current CC state, where a disallowed CC state is outside the search space but within the analysis space; and
    based on the time-mapping and the consumption metric data, determine, responsive to a non-linear search iteration of the non-linear search, a consumption-constrained CC state comprising a static reservation prescription for at least the first virtual machine;
  store, via operation at the data staging layer, the consumption-constrained CC state;
  at a prescriptive engine layer of the CCR stack:
    access the consumption-constrained CC state;
    analyze the consumption-constrained CC state responsive to a feedback history based on commands from a committed compute (CC) control interface;
    responsive to analyzing the consumption-constrained CC state, generate a committed compute window (CC-window) presentation for the CC control interface; and
    after generation of the CC-window presentation, generate a reservation matrix based on at least the consumption-constrained CC state and the feedback history; and
  send, via the network interface circuitry, the reservation matrix to a host interface configured to control static reservation and dynamic requisition for at least the first virtual machine, the reservation matrix including one or more requests for one or more committed compute virtual machines of the set of virtual machines.

19. The product of claim 18, where the instructions are further configured to cause the machine to generate the reservation matrix based further on an input selection received from the CC control interface responsive to the CC-window presentation.

20. The product of claim 18, where the CC-window presentation includes consumption metric data for the consumption-constrained CC state.

* * * * *